3,333,634
SECONDARY RECOVERY METHOD ACHIEVING HIGH MACROSCOPIC AND MICROSCOPIC SWEEP EFFICIENCY
Harold L. Townsend, Dallas, James M. McMillen, Arlington, and Sherrod A. Williams, Jr., Dallas, Tex., assignors to Mobil Oil Corporation, a corporation of New York
No Drawing. Filed June 29, 1965, Ser. No. 468,144
27 Claims. (Cl. 166—9)

This invention pertains to recovery of petroleum from a subterranean formation. More particularly, the invention pertains to recovery of petroleum contained in a subterranean formation by flowing therein one or more liquids.

The pertoleum, more commonly called crude oil or simply oil, accumulated in subterranean formations is recovered or produced therefrom through wells, called production wells, drilled into the subterranean formations. A large amount of the oil is left in the subterranean formations if produced only by primary depletion, i.e., where only initial formation energy is used to recover the oil. Where the initial formation energy is inadequate or has become depleted, supplemental operations, often referred to as secondary recovery operations, are employed. In the most successful and most widely used of these operations, a fluid is injected through injection means, comprising one or more injection wells, and passed into the formation. Oil is displaced within and is moved through the formation, and is produced from production means, comprising one or more production wells, as the injected fluid passes from the injection means toward the production means. In a particular recovery operation of this sort, water is employed as the injected fluid and the operation is referred to as a waterflood. The injected water is referred to as the flooding liquid, or flooding water, as distinguished from the in-situ, or connate, water.

Waterflooding is a very useful method of recovery but suffers, primarily, from two disadvantages. The first is its relatively poor microscopic displacement of the oil from within the interstices of the subterranean formation. The microscopic displacement may be expressed as microscopic sweep efficiency, which is defined in percent as the ratio of the amount of oil displaced from the pore space of the portion of the formation through which the flooding liquid has passed, to the original amount of oil therein. The relatively poor microscopic displacement is due to the property of immiscibility which the water, as with the flooding liquid, has with the oil it seeks to displace. There is a relatively high interfacial tension between the water and the oil and an unfavorable contact angle made by the interface between the two liquids with the solid surface. Where the flooding liquid is miscible with the oil within the formation, i.e., miscible flooding, these conditions do not occur. Hence, conventional waterflooding does not achieve a microscopic sweep efficiency as high as does miscible flooding. It is generally conceded that although it may otherwise have disadvantages in particular formations, miscible floding achieves the maximum microscopic sweep efficiency possible for any given formation.

The second disadvantage of waterflooding is known as premature breakthrough. Premature breakthrough is defined as the production of the injected water at a production well before the oil displaced from within the formation ahead of the waterflood has been produced. Premature breakthrough reduces the areal or macroscopic sweep efficiency of the waterflood in proportion to the degree of prematurity. The primary causes of premature breakthrough are permeability stratification and the tendency of the more mobile flooding water to "finger" through a subterranean formation containing less mobile oil and, thus, to bypass substantial portions thereof. By fingering is meant the devolping, in the floodfront, of unstable bulges or stringers which advance toward the production means more rapidly than the remainder of the floodfront. The fingering produces nonuniform injection and flow profiles.

The prior art is replete with suggestions for curing both the premature breakthrough and the relatively poor microscopic displacement of water floods. Despite using the suggested improvements, much oil continues to remain in the subterranean formation when a waterflood has reached its economic limit, i.e., when the expense of treating and recirculating the water begins to cost more than the value of the oil recovered.

Accordingly, it is an object of the invention to provide a method of enhancing the microscopic sweep efficiency of a waterflood used to recover oil from a subterranean formation.

Particularly, it is an object of the invention to provide a method of carrying out a waterflood which achieves a microscopic sweep efficiency approximating that of a miscible flood.

It is another object of the invention to provide a method of alleviating premature breakthrough of a waterflood.

It is another object of the invention to provide a method of enhancing both macroscopic and microscopic sweep efficiency of a waterflood used to recover oil from a subterranean formation.

Further objects and attendant advantages of the invention will be apparent from the following description.

In accordance with the invention, there is provided an improvement in a method for recovering oil from an oil-containing subterranean formation wherein there is injected a flooding liquid through an injection means and into the formation, and oil is produced from the formation through a production means. The improvement comprises injecting into the formation an aqueous solution having incorporated therein an additive system in quantity sufficient to decrease the oil-water interfacial tension and to impart viscoelastic, shear hardening, and positive nonsimple rheological properties to the aqueous solution. Hereinafter, each of these rheological properties will be referred to simply as the properties of viscoelasticity, shear hardening, and positive nonsimplicity. The additive system is comprised of:

(a) a strong electrolyte;
(b) an alkyl aryl oxypoly(ethoxy)ethanol having the following structural formula:

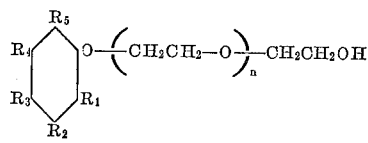

(1)

where $R_1$, $R_2$, $R_3$, $R_4$, or $R_5$ is either hydrogen or an alkyl hydrocarbon group, at least one of $R_1$, $R_2$, $R_3$, $R_4$, and $R_5$ is an alkyl hydrocarbon group containing at least 8 carbon atoms, and the total number of carbon atoms in the R groups taken together does not exceed 19, and $n$ is at least 2 and no greater than 6 when the total number of carbon atoms in the R groups is 8, and is one larger for each additional carbon atom above 8 in the total number of carbon atoms in the R groups; and (c) an M dialkyl sulfosuccinate having the following structural formula:

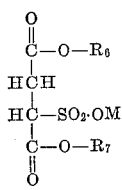

(2)

where M is a cation and is lithium, potassium, sodium, ammonium, anilinium, o-toluidinium, p-toluidinium, m-toluidinium, methylammonium, ethylammonium, n-propylammonium, iso-propylammonium, n-butylammonium, iso-butylammonium, sec-butylammonium, or tert-butylammonium, and $R_6$ and $R_7$ are alkyl groups containing 5 to 16 carbon atoms, inclusive.

The aqueous solution containing the strong electrolyte, the alkyl aryl oxypoly(ethoxy)ethanol, and the M dialkyl sulfosuccinate is hereinafter referred to as the active solution. The reasons why the solution is called active will be apparent from the discussion which follows.

Using the active solution, we have achieved an interfacial tension as low as one one-thousandth that of the usual interfacial tension between an aqueous solution and a hydrocarbon phase, as shown in Example 1. Reductions on this order of magnitude enable an increased displacement of oil from interstices of a subterranean formation by the aqueous solution being used as a flooding liquid.

The active solutions are viscoelastic. A viscoelastic solution is a solution which possesses both elastic and viscous properties. Viscoelastic solutions have a characteristic viscosity function, which function may or may not be dependent on rate of shear or stress. They also exhibit elasticity of shape and a retarded elastic recovery in deformation.

In laminar flow of a viscoelastic solution, components of stress which are normal as well as tangential to the direction of the stress frequently develop and secondary flow effects appear. Thus, the normal stresses in a viscoelastic solution flowing in a circular conduit cause an appreciable axial tension to develop. When the flowing liquid emerges from a circular conduit, the tension in the streamlines relaxes with the result that the liquid stream swells to a diameter in excess of the diameter of the conduit. Accordingly, the liquid leaving the conduit expands or bulges outwardly, forming what might be termed an enlarged bulb at the opening of the conduit.

Another characteristic of a viscoelastic solution is its flow behavior between concentric cylinders having relative rotation with respect to each other. Analysis of the complete spatial distribution of stress for a viscoelastic solution in this situation shows that the primary phenomenon is the appearance of an additional tension along the streamlines. Between the concentric cylinders, at least one of which is rotating, the streamlines are circles and the tension becomes a hoop or strangulation stress which constricts the liquid toward the axis of rotation. As a consequence, the liquid tends to climb the inner cylinder and a pronounced thrust develops.

Further, with respect to the characteristics of a viscoelastic solution, it can be shown by theoretical analysis that flow in rectilinear paths through conduits of arbitrary cross section under a constant pressure gradient is not always possible for certain of these solutions. Thus, if the flow conduit is non-cylindrical, superimposed onto the simple rectilinear motion is a steady motion in which liquid particles follow spiral paths to develop a vortex-like motion.

Each of the properties of a viscoelastic solution described above is of value in displacing oil from a subterranean formation. Flow of the liquid through the interstices of a subterranean formation will ordinarily be laminar. Thus, with the development of axial tension of the viscoelastic solution upon flow from restraining portions of substantially circular interstices or conduits within the formation, the resulting bulging effect enables the viscoelastic solution to displace the oil from adjacent wider portions of the interstices. The development of tension along the streamlines of flow of the viscoelastic solution and the development of thrust by the solution will additionally effect displacement of oil otherwise trapped within the interstices of the formation. Furthermore, the development of vortex-like motion in the flow of the viscoelastic solution in noncircular interstices effects a thorough displacing action of the oil from the interstices by the viscoelastic solution.

As the name implies, a shear hardening solution is a solution which hardens, i.e., develops a higher viscosity, when subjected to certain rates of shear. The property of shear hardening thus enables such a liquid to develop a higher viscosity when subjected to a higher rate of shear in a subterranean formation. Such a higher rate of shear is induced in a liquid when it flows in a more permeable stratum than when it flows in parallel, i.e., under the influence of the same pressure drop, in a less permeable stratum within a subterranean formation. A shear hardening liquid thus is active in that it becomes selectively more viscous in the more permeable strata than in the less permeable strata. As a result, the rates of flow of the liquid in the more permeable and in the less permeable strata become more nearly equal and premature breakthrough is lessened.

A positive nonsimple solution is a solution which has a higher viscosity when it flows in a more permeable stratum than when it flows at the same nominal rate of shear in a less permeable stratum. A positive nonsimple solution thus is active in the sense that it adjusts its properties to flow at a rate which is relatively insensitive to the permeability of the various strata within a subterranean formation through which it is flowing. This phenomenon differs from that of shear hardening in that the positive nonsimple solution increases in viscosity in the more permeable strata through which it is flowing, even at equal rates of shear. Permeability controls whether a flowing positive nonsimple solution becomes more viscous or not; whereas shear rate controls whether a flowing shear hardening solution becomes more viscous or not. Both phenomena operate to achieve more nearly uniform injection and flow profiles of a shear hardening, positive nonsimple solution passing through a subterranean formation.

Through the properties of shear hardening and positive nonsimplicity, the active solutions improve the macroscopic sweep efficiency and thus enable the recovery of a greater portion of the oil from a subterranean formation before they break through at a production well. Since the active solutions are also good surfactants and are also viscoelastic, they improve the microscopic sweep efficiency as they pass through the subterranean formation.

Whether a particular solution exhibits the property of viscoelasticity or not can be determined by one of many well-known tests. If a solution exhibits the previously described properties, e.g., (1) swelling to a diameter in excess of the diameter of the conduit upon emerging therefrom or (2) climbing an immersed cylinder having rotational motion with respect thereto, it is viscoelastic. Further tests for determining whether a liquid is viscoelastic or not may be found in a number of published books discussing the phenomenon, e.g., Viscoelastic Properties of Polymers, J. D. Ferry, Wylie Publishing Company, New York, 1961.

Whether a particular solution exhibits the properties of shear hardening or positive nonsimplicity, can be determined from its behavior in a rotational viscometer, such as a Couette-type viscometer. The viscosity of the solution, measured as a function of the rate of shear on such a rotational viscometer at different gap sizes, indicates the existence of each of the properties. The gap size in such a viscometer is the distance separating the concentric cylinder walls immersed in the solution whose viscosity is being measured. The curve which results from plotting the data obtained on the viscometer, e.g., plotting the viscosity as the ordinate against the shear rate as the abscissa, depicts the properties of shear hardening or positive nonsimplicity. If the curve representing the viscosity of the solution increases with increasing shear rates within a certain range of shear rates, the solution is a shear hardening liquid. If the viscosity of the solution is higher when measured in a larger gap size at the same shear rate, the solution is a positive nonsimple liquid. A convenient instrument with which to measure the solution viscosity is the Brookfield Model LVT Synchro-Lectric Viscometer with a U.L. Adapter.

The properties of shear hardening and positive nonsimplicity also can be determined by flowing a liquid through models or core samples of subterranean formations having different permeabilities. The pressure drop at a known flow rate may be measured and the viscosity calculated therefrom. By taking measurements over a range of flow rates, the solution flow properties may be characterized as a function of permeability and shear rate. Such determinations carried out in models or core samples are time consuming, and the use of a rotational viscometer is preferred to delineate liquids having the properties of shear hardening and positive nonsimplicity.

In the practice of the invention, the requisite concentration, as discussed hereinafter, of the additive system is incorporated into water to form the active solution. The term "water" is used herein to include dilute aqueous solutions such as surface water, well water, rain water, city water, treated waste water, and suitable oil field brines. Where brine is employed to prepare the active solution, the concentration of sodium chloride therein may be limited with certain of the additive systems as discussed more fully hereinafter. The term "additive system" is used hereinafter and in the claims to include a particular additive system alone or in admixture with other suitable compounds, such as enumerated herein.

It is preferred to employ as a strong electrolyte a water-soluble inorganic salt. The ammonium or alkali metal salts are illustrative. Particularly, the ammonium halides and the alkali metal halides are employed. Sodium chloride is preferred. Illustrative of another suitable strong electrolyte is tetrasodium pyrophosphate. Strong electrolytes in general are discussed and examples enumerated at page 506 of Outlines of Physical Chemistry, Farrington Daniels, John Wiley & Sons, Inc., New York, 1948. The strong electrolyte is chosen which is compatible with the particular formation and fluids therein. Doubts as to compatibility can be resolved by simple emperical tests.

The alkyl aryl oxypoly(ethoxy)ethanol used in the additive system is commonly referred to as an alkyl aryl alcohol having the desired average number of ethylene oxide groups in its molecular structure. An example is nonyl phenol with 6 mols of ethylene oxide. Referring to structure Formula 1, one of the R groups, i.e., $R_1$, $R_2$, $R_3$, $R_4$, or $R_5$, as stated, must contain at least 8 carbon atoms. Increasing the total number of carbon atoms in the R groups increases the oil solubility of the compound. While more than 8 carbon atoms in the R groups tends to neutralize the effects of minor impurities in the additive system, the lowest interfacial tensions and the most active solutions are obtained with compounds having 8 or 9 carbon atoms in one of the R groups as discussed below. The total number of carbon atoms in the R groups, also as stated, should not exceed 19. Including more than 19 carbon atoms in the R groups increases the cost, decreases the shear hardening and positive nonsimple activity, and adversely affects the reduction of interfacial tension between the solution containing the additive system and the oil.

In attaining the low interfacial tension between the oil and the water phases, it is vital that the proper hydrophobe-hydrophil balance be maintained in the alkyl aryl oxypoly(ethoxy)ethanol when extra carbon atoms are added to the compound. This balance is effected by adding one ethylene oxide group for each extra carbon atom above 8 incorporated into the R groups. The proper hydrophobe-hydrophil balance is achieved when the poly(ethoxy) portion of the oxypoly(ethoxyethanol substituent contains an average number, $n$, or from 2 to 6 mols, inclusive, of ethylene oxide when there is only one alkyl group, i.e., one R group, containing 8 carbon atoms therein. Since $n$ represents an average number of ethylene oxide groups, it is not restricted to whole numbers but may be any number, e.g., 3.9. To illustrate this maintenance of balance, when the alkyl group increases to a nonyl compound and one other R group increases from hydrogen to a —$CH_3$, i.e., 2 carbon atoms added, the number of mols of ethylene oxide required in the poly(ethoxy) portion of the molecule is an average of from 4 to 8, inclusive.

The preferred alkyl aryl oxypoly(ethoxy)ethanols are those in which there is only one alkyl group which is an iso-octyl or iso-nonyl group, and in which the poly(ethoxy) group contains an average of from 3 to 6 mols, inclusive, of ethylene oxide. It is preferred that the alkyl group be substituted in the para position to the oxypoly(ethoxy)ethanol substituent on the phenyl ring.

In the M dialkyl sulfosuccinate used in the additive system, the dialkyl groups, $R_6$ and $R_7$, contain, as stated, from 5 to 16 carbon atoms each, inclusive. Preferably, however, they contain from 6 to 10 carbon atoms each, inclusive. The best results are obtained, ordinarily, when each alkyl group contains about 8 carbon atoms. Although it is preferred that the dialkyl groups $R_6$ and $R_7$ be the same, they do not necessarily have to be the same.

In general, the sodium dialkyl sulfosuccinates are more economical than the other alkali metal sulfosuccinates. Suitable sodium dialkyl sulfosuccinates include sodium di(2-ethylhexyl) sulfosuccinate, sodium di-iso-octyl sulfosuccinate, sodium, di-n-octyl sulfosuccinate, sodium di-iso-nonyl sulfosuccinate, sodium di-n-nonyl sulfosuccinate, sodium di-iso-hyptyl sulfosuccinate, sodium di-n-heptyl sulfosuccinate, sodium di-n-heptyl sulfosuccinate, sodium di-iso-hexyl sulfosuccinate, sodium di-n-hexyl sulfosuccinate, sodium di-iso-decyl sulfosuccinate, and sodium di-n-decyl sulfosuccinate. Other alkali metal cations may be employed in the foregoing compounds.

Suitable ammonium dialkyl sulfosuccinates include ammonium di(2-ethylhexyl) sulfosuccinate, ammonium di-iso-octyl sulfosuccinate, ammonium di-n-octyl sulfosuccinate, ammonium di-iso-nonyl sulfosuccinate, ammonium di-n-nonyl sulfosuccinate, ammonium di-iso-heptyl sulfosuccinate, ammonium di-n-heptyl sulfosuccinate, ammonium di-iso-hexyl sulfosuccinate, ammonium di-n-hexyl sulfosuccinate, ammonium di-iso-decyl sulfosuccinate, and ammonium di-n-decyl sulfosuccinate.

Typical of suitable substituted ammonium dialkyl sulfosuccinates are the secondary butylammonium dialkyl sulfosuccinates. Suitable secondary butylammonium dialkyl sulfosuccinates include sec-butylammonium di-iso-octyl sulfosuccinate, sec-butylammonium di-n-actyl sulfosuccinate, sec-butylammonium di-iso-nonyl sulfosuccinate, sec - butylammonium di - n - nonyl sulfosuccinate, sec - butlyammonium, di - iso - heptyl sulfosuccinate, sec-butylammonium di-n-heptyl sulfosuccinate, sec-butylammonium di - iso - hexyl sulfosuccinate, sec-butylammonium di-n-hexyl sulfosuccinate, sec-butylammonium di-iso-decyl sulfosuccinate, and sec-butylammonium di-n-decyl sulfosuccinate.

The sodium di(2-ethylhexyl) sulfosuccinate is preferred.

The alkali metal dialkyl sulfosuccinates or the ammonium dialkyl sulfosuccinates are readily synthesized by reacting a maleic anhydride with an alcohol having the desired length alkyl groups and sulfonating with an alkali metal bisulfite or an ammonium bisulfite. When this method of preparation is used, there is realized the preferred embodiment wherein $R_6$ and $R_7$ are the same. The reaction forming sodium dialkyl sulfosuccinate is illustrative and is depicted as follows:

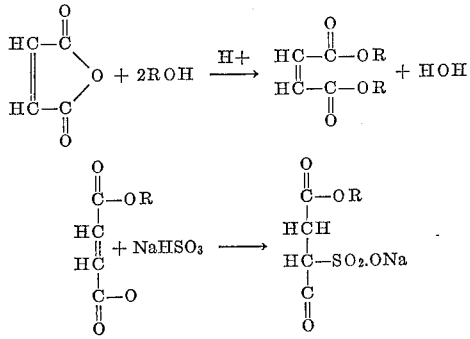

The substituted ammonium dialkyl sulfosuccinates may be obtained by converting the sodium salt to the hydrogen form, using an acid-ion-exchange resin, followed by neutralization with the appropriate amine.

The additive systems and the additives which make up each system are employed in the active solutions in an amount sufficient to convert the water to which they are added into a solution which is viscoelastic and which is a shear hardening, positive nonsimple liquid. This amount can be determined empirically for each reservoir and for the fluids, particularly the oil and the aqueous liquids, contained therein. The following guidelines have been found helpful in preparing the active solutions under varied condiitons.

A concentration of strong electrolyte of from about 0.04 to about 0.77 mol percent is required in the active solutions used in the method of the invention. Preferably, about 0.04 to about 0.31 mol percent is employed. When sodium chloride is used, this concentration requires from about 0.13 to about 2.5 percent by weight of sodium chloride in the active solutions. Preferably, about 0.20 to about 1.0 percent by weight of sodium chloride is employed. The lowest interfacial tension and the greatest shear hardening and positive nonsimple activity are obtained at a concentration of about 0.5 percent by weight of sodium chloride in the active solutions. With a concentration of strong electrolyte less than about 0.04 or greater than about 0.77 mol percent, the solutions become inactive, i.e., they are apparently no longer shear hardening, positive nonsimple liquids in the temperature range encountered in most subterranean formations.

A concentration of the alkyl aryl oxypoly(ethoxy) ethanol of from about 0.0007 mol percent to about 0.05 mol percent is required in the active solution having the desired low interfacial tensions for use in the method of the invention. When nonyl phenyl oxypenta(ethoxy) ethanol is employed, a concentration of from about 0.02 to about 1.5 percent by weight is required in the active solution. The lowest interfacial tension and the greatest shear hardening and positive nonsimple activity are obtained at a concentration of about 1.0 percent by weight of nonyl phenyl oxypenta(ethoxy)ethanol.

A concentration of M dialkyl sulfosuccinate of from about 0.0008 to about 0.04 mol percent is employed in forming the active solutions. The higher concentrations, e.g., up to about 0.04 mol percent, are employed only in subterranean formations having either a stratum of extremely high permeability or temperatures in excess of about 40° C. Preferably, a concentration of about 0.02 mol percent or less of M dialkyl sulfosuccinate is employed. Concentrations higher than 0.02 mol percent create more viscous solutions which, even when used in conjunction with a nonionic surfactant, necessitate undesirably high pressure for injection and flow in subterranean formations. We have found that a concentration of about 0.008 mol percent of M dialkyl sulfosuccinate is adequate for most subterranean formations. The M dialkyl sulfosuccinate tends to be adsorbed onto the surface of many subterranean formations. This concentration of 0.008 includes 0.006 mol percent of M dialkyl sulfosuccinate to compensate for this adsorption. Molar concentrations of from 0.0008 to 0.002 mol percent of M dialkyl sulfosuccinate form the most preferred solutions from the standpoint of activity and viscosity.

When sodium di(2-ethylhexyl) sulfosuccinate is used in creating the active solution, a concentration of from 0.02 to 1.0 percent by weight is employed. Preferably, a concentration of 0.5 percent by weight or less is employed. A concentration of from 0.02 to 0.2 percent by weight may be employed and gives satisfactory results, even with adsorption onto the formation. A concentration of from 0.02 to 0.05 percent by weight of sodium di(2-ethylhexyl) sulfosuccinate forms the most preferred solution from the standpoint of activity and viscosity.

The additive system may be incorporated in only a portion of the water employed in the waterflood to create a slug or slugs of active solution. The slugs should have a volume of from 0.1 to 30 percent, preferably 1 to 10 percent, of the pore volume of the formation. The slug of active solution is injected through the injection well and passed into the formation. The slug may be driven into the formation by injecting behind it a driving fluid such as water or natural gas. Such a slug may be injected only once or may be injected alternately with a volume of driving fluid, preferably having at least the same volume as the slug and preferably being untreated water, between alternate slugs of active solution to achieve the desired recovery of oil from the subterranean formation. Instead of untreated water, water having lower concentrations of the additive system and hence less activity may be used between alternate slugs of active solution. Each slug of active solution tends to even out the flow, to alter the pressure gradients, and more nearly to compensate for permeability stratification in the formation. Hence, the greater the number of treated slugs, the more effective will be the flood. The particular formation will dictate the economics of the amount and frequency of the slugs which are to be injected, ranging from one slug to treating all of the flooding water.

The active solution is particularly effective in achieving improved microscopic displacement when there is injected ahead of it a slug of from 0.1 to 10 percent of the pore volume of the formation of a hydrocarbon solution containing the alkyl aryl oxypoly(ethoxy)ethanol set forth in Formula 1. The hydrocarbon solution comprises a hydrocarbon solvent and a concentration of from about 0.009 to about 0.7 mol percent of alkyl aryl oxypoly (ethoxy)ethanol.

The concentration of alkyl aryl oxypoly(ethoxy) ethanol which is employed in the hydrocarbon solution is not particularly critical. Since mol percent is sometimes difficult to compute accurately when using complex mixtures of hydrocarbons as solvents, it is more convenient to measure concentration in weight percent. For example, iso-nonyl phenyl oxypenta(ethoxy)ethanol is employed in a concentration of from 0.02 to 1.5 percent by weight of the hydrocarbon solution. Preferably, a concentration of from 0.1 to 1.0 percent by weight of this compound is employed.

By hydrocarbon solvent is meant a solvent consisting primarily of hydrocarbons. Hydrocarbon solvent includes higher molecular weight hydrocarbons or mixtures thereof, e.g., crude oil from a subterranean formation. It includes products such as heating oils, gasolines, or naphthas. Normally gaseous hydrocarbons such as propane or liquefied petroleum gas are particularly desirable solvents from the point of view of economy. However, they need to be mixed with heavier hydrocarbons to form a hydrocarbon solvent which will dissolve the requisite amount of alkyl aryl oxypoly(ethoxy) ethanol. Mixtures of liquefied petroleum gas or propane in proportion of from 1 to 10 to 10 to 1 with a non-asphaltic crude oil are suitable hydrocarbon solvents.

In operation of the process in this manner, the injected slug of hydrocarbon solution miscibly displaces, i.e., achieves almost 100 percent microscopic sweep efficiency in the displacement of, the in-situ oil, leaving the hydrocarbon solvent containing the alkyl aryl oxypoly(ethoxy)ethanol. The alkyl aryl oxypoly(ethoxy)ethanol is a nonionic surfactant and is more resistant to being adsorbed onto the formation than anionic or cationic surfactants. It is also resistant to being adsorbed onto the formation since it is in an oil phase which will generally be the non-wetting phase for formations where the method of the invention is employed, as discussed more fully hereinafter. The injected slug of active solution then displaces the hydrocarbon solution. The interfacial tension between the hydrocarbon solution and the active solution is extremely low, about $10^{-3}$ dynes per centimeter. Thus, there is realized almost 100 percent microscopic sweep efficiency in the displacement of the hydrocarbon solution from the interstices within the formation by the active solution. Because the active solution tends to prevent premature breakthrough and to even out the injection and flow profiles within the subterranean formation, an improved macroscopic sweep efficiency is realized along with the advantages of miscible flood in improving microscopic sweep efficiency.

It is possible to precipitate a divalent salt such as calcium dialkyl sulfosuccinate if the active solution comes in contact with formation liquids containing certain divalent ions, such as calcium. It is preferred to take steps to prevent such precipitation. One way to prevent such precipitation is to inject a slug of from 0.01 to 10.0 percent or more of a pore volume of water in advance of the active solution. The water will build up a bank and miscibly displace the aqueous formation liquids containing the divalent ions, thus preventing contact of the active solution with the aqueous formation liquids.

Another way to prevent precipitation of a divalent dialkyl sulfosuccinate is to incorporate into the active solution a chelating or sequestering agent, such as tetrasodium salt of ethylenediaminetetraacetic acid, sold commercially as sodium Versenate, or sodium phosphate glass, commonly called sodium hexametaphosphate and sold commercially as Calgon. The chelating agents are strong electrolytes. Therefore, the total concentration of chelating agents and other strong electrolytes should not exceed the limitation discussed hereinbefore. Where a chelating agent is employed, the amount thereof should be at least 0.1 percent by weight. Generally, the amount of chelating agent employed is less than about 1.7 percent by weight. Alternatively, a slug of from 0.01 to 1.0 percent of a pore volume of an aqueous solution of the chelating or sequestering agent may be injected into the formation ahead of the active solution.

If desired, both ways of avoiding precipitation of a divalent dialkyl sulfosuccinate may be combined. Thus, a slug of water may be injected into the injection well and passed into the formation, followed by a slug of the chelating agent, prior to the active solution. If the active solution is injected in a slug following the slug of water and the slug of chelating agent in solution, it will be passed through the formation by injecting thereafter a driving fluid such as water. In the event that subsequent slugs of active solution are injected, it is unnecessary to inject the chelating agent or a separate slug of fresh water in advance of such slugs of active solution.

While the method of the invention is beneficial in improving the recovery of oil from any oil-containing subterranean formation, it is more effective where the oil-containing subterranean formation is preferentially water wettable. By water wettable is meant a contact angle of less than 90 degrees measured through the water phase made by the interface between the water and the oil with the solid surface of the formation. The contact angle and wettability phenomena are well known and are discussed in published references. For example, a discussion of contact angle and wettability is given by J. E. Melrose in his "Solid-Fluid Interfacial Tensions," in a book entitled, Contact Angle, Wettability, and Adhesion, Advances in Chemistry Series 43, American Chemical Society, Washington, D.C. (1964) at pages 158–179, particularly page 161. To obtain the best results in those subterranean formations which are preferentially oil wettable, i.e., where the contact angle is greater than 90 degrees, it is preferred to convert the preferential wettability such that the formation is rendered preferentially water wettable before employing the method of the invention.

Any of the known methods of converting a subterranean formation from a preferentially oil-wettable state to a preferentially water-wettable state may be employed. One such previously published procedure is described in U.S. Patent No. 3,028,912 by V. J. Berry, Jr., et al.

The following examples will be further illustrative of the invention. In these examples, the efficacy of the flooding liquids employed in the method of the invention in recovering oil is demonstrated in Berea sandstone core samples having some striations therein. The core samples were selected to have as nearly the same porosity and permeability as practical and were stabilized by treating with a sodium carbonate flux and firing to approximately 1300° C. to insure chemical neutrality. The core samples had physical properties of approximately the following values: gas permeabilities of 546 millidarcies, a porosity of 0.22, a length of 31 centimeters, an area of 19.3 square centimeters, and a port volume of 130 cubic centimeters. The core samples were put into standard sleeve mountings—held in a Hassler cell with 250-pound sleeve pressure in Example 1, and sealed in a Plexiglas mount having end plates for attachment of flow lines in Example 2. The flood tests were carried out in a temperature-controlled box at 25° C.±0.1° C.

EXAMPLE 1

This example illustrates the superiority of the active aqueous solution over water in recovering oil from the core sample.

In this example, the core sample was flushed to equilibrium conditions with carbon dioxide, then saturated with distilled water. Water was flowed through the core sample until equilibrium pressure drop across the core sample was obtained. From the equilibrium pressure drop, the liquid permeability was calculated, employing Darcy's law. An oil phase, i.e., hexadecane, was introduced into the core sample by capillary desaturation at a pressure of 65 centimeters of mercury, the water displaced by the oil being measured to determine oil saturation. Oil saturation was 77 percent. Next, a simulated waterflood was carried out on the core sample.

In the simulated waterflood, water was passed through the core sample at a measured flow rate, pressure, and volume. The flow rate was controlled with a positive displacement Ruska pump, a pump rate of 1 cubic centimeter per hour being equivalent to a velocity or flood rate of 0.182 foot per day. The water was flowed through the core sample until no more oil was produced at each flow rate employed. The cumulative volume of oil removed from the sample by the water was measured at the end of each flow rate. Following the passage of the water through the core sample, a slug of aqueous solution, designated HT2, was passed through the core sample at the same measured flow rates and at measured pressures and in measured volumes. The HT2 solution was an active solution comprising 0.75 percent by weight sodium chloride, 0.05 percent by weight nonyl phenyl oxytri(ethoxy)ethanol, 0.4 percent by weight sodium di(2-ethylhexyl) sulfosuccinate, and the remainder water. The flow rates were controlled similarly as described above in connection with the water. The flow rates were maintained constant, and the aqueous solution was flowed through the core sample until no more oil was being produced at each flow rate. The cumulative volume of oil removed from the core sample by the aqueous solution was measured.

The data are summarized in Table I. In Table I, the recovery is given as the total amount of oil, expressed on the basis of percent of the amount of oil in the core sample prior to the simulated waterflood, removed from the core sample by both the simulated waterflood and by the aqueous solution. The flood volume is the amount, expressed in terms of the pore volume of the core sample, of the water employed in the simulated waterflood, or of the aqueous solution employed in the further flooding. The velocity is the equivalent flood rate as determined from the rate at which the water or aqueous solution was pumped.

For the final rate, i.e., flooding with the aqueous solution at 560 cubic centimeters per hour, approximately 89.2 percent of the oil had been recovered from the core sample after 1.7 pore volumes of the flooding liquid had been flowed through the core sample. The flooding liquid was allowed to stand in the core sample for two days. A subsequent throughput of 1.3 pore volumes at 560 cubic centimeters per hour increased the total recovery to 95.6 percent of the oil originally in the core sample. The flooding liquid was then allowed to remain in the core sample overnight. Another pore volume of flooding liquid was flowed through the core sample at 560 cubic centimeters per hour. The total oil recovery increased to 96.0 percent of the oil originally in the core sample.

TABLE I

| Flooding Liquid | Pump Rate, cc./hr. | Velocity, ft./day | Flood Volume, $V_p$ | Recovery, percent of oil in place |
|---|---|---|---|---|
| Distilled water | 17.5 | 3.3 | 1.5 | 46.6 |
| Do | 560 | 105.7 | 1.5 | 48.6 |
| HT2 | 17.5 | 3.3 | 1.5 | 56.4 |
| HT2 | 560 | 105.7 | 1.7 (3.0-4.0) | 89.2 (95.6-96.0) |

While the active solution employing nonyl phenyl oxytri(ethoxy)ethanol is demonstrated in the foregoing example, an active solution employing nonyl phenyl oxypenta(ethoxy)ethanol is even better. The active solution employing nonyl phenyl oxypenta(ethoxy)ethanol achieves essentially the same degree of activity and an even lower interfacial tension. The usual interfacial tension of about 50 dynes per centimeter between hexadecane and water is lowered to about 0.005–0.006 dyne per centimeter with about 1 percent by weight of nonyl phenyl oxypenta(ethoxy)ethanol in the aqueous solution. In comparison, employing nonyl phenyl oxytri(ethoxy)ethanol achieves an interfacial tension of about 0.1 dyne per centimeter.

EXAMPLE 2

This example illustrates the efficacy of employing an oil solution of the alkyl aryl oxypoly(ethoxy)ethanol ahead of the aqueous solution in achieving a high percent recovery of oil from a core sample.

In this example, the procedures employed were similar to those described in connection with Example 1 but, to simulate employing multiple flooding liquids, were modified in the following respects. The core sample was flushed to equilibrium conditions with carbon dioxide, then saturated with the HT2 solution, described in Example 1.

Since previously performed floods had demonstrated that a hydrocarbon solution would miscibly displace all of the oil phase from a core sample, a hydrocarbon solution was employed as the simulated oil phase. The hydrocarbon solution consisted of a solvent of 80 percent hexadecane, 10 percent cyclohexane, and 10 percent toluene, to which was added as a solute 1.0 percent by weight of nonyl phenyl oxytri(ethoxy)ethanol. This hydrocarbon solution was flowed directly into the core sample saturated with the HT2 solution, and flow continued until no more HT2 solution was being produced. The displaced HT2 solution was measured to determine the oil saturation. The oil saturation was 73.7 percent. The HT2 solution was then flowed through the core at various measured flow rates, pressures, and volumes. In addition to the usual volume measurements, gravimetric determinations of the plastic sleeve containing the core sample and the liquid phases were employed to check the saturation of each phase in the core sample at various times during the test. When flowing at a rate of 5.409 cubic centimeters per hour, no more oil was being produced when a flood volume of 1 pore volume, $V_p$, of HT2 solution had been flowed through the core. After sitting overnight, however, another pore volume throughput increased the total oil recovery from 85.6 to 90 percent of the original oil in place. No further oil was being produced at the termination of each respective run denoted by the respective flow rates in Table II.

The data are summarized in Table II. In Table II, the same headings are employed as were used in Table I and with the same connotations.

TABLE II

| Pump Rate, cc./hr. | Velocity, ft./day | Flood Volume, $V_p$ | Recovery, percent of oil in place |
|---|---|---|---|
| 5.409 | .99 | 1.0 | 85.6 |
| 5.409 | .99 | 1.0 | 90.0 |
| 21.637 | 3.87 | ~2.0 | 96.8 |
| 86.546 | 15.50 | ~1.5 | 98.7 |
| 140.625 | 25.19 | ~2.0 | 99.5 |

Having thus described our invention, it will be understood that such description has been given by way of illustration and example and not by way of limitation, reference for the latter purpose being had to the appended claims.

What is claimed is:
1. In a method for recovering oil from a subterranean formation, the improvement comprising the step of injecting into said formation an active solution comprising water containing an additive system in sufficient quantities to lower interfacial tension with the oil and to impart viscoelastic, shear hardening, and positive nonsimple rheological properties thereto, said additive system comprising:
  (a) a strong electrolyte;
  (b) an alkyl aryl oxypoly(ethoxy)ethanol having the following structural formula:

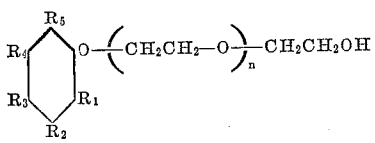

where $R_1$, $R_2$, $R_3$, $R_4$, and $R_5$ are selected from the group consisting of hydrogen and an alkyl group, at least one of $R_1$, $R_2$, $R_3$, $R_4$, and $R_5$ is an alkyl group containing at least 8 carbon atoms, and the total number of carbon atoms in the R groups taken together does not exceed 19, and
  $n$ is at least 2 and no greater than 6 when said total number of carbon atoms in said R groups is 8 and is one greater for each additional carbon atom above 8 in said total number of carbon atoms in said R groups; and
  (c) an M dialkyl sulfosuccinate having the following structural formula:

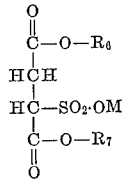

where M is a cation selected from the group consisting of lithium, potassium, sodium, ammonium, anilinium, o-toluidinium, p-toluidinium, m-toluidinium, methylammonium, ethylammonium, n-propylammonium, iso-propylammonium, n-butylammonium, isobutylammonium, sec-butylammonium, and tert-butylammonium, $R_6$ is an alkyl group containing 5 to 16 carbon atoms, inclusive, and $R_7$ is an alkyl group containing 5 to 16 carbon atoms, inclusive.

2. The method of claim 1 wherein said strong electrolyte is in a concentration of from 0.04 to 0.77 mol percent of said active solution.

3. The method of claim 2 wherein said strong electrolyte is in a concentration of from 0.04 to 0.31 mol percent of said active solution.

4. The method of claim 1 wherein said strong electrolyte is an alkali metal halide.

5. The method of claim 4 wherein said alkali metal halide is sodium chloride.

6. The method of claim 5 wherein said sodium chloride is present in an amount of from 0.13 to 2.5 percent by weight of said active solution.

7. The method of claim 6 wherein said sodium chloride is present in an amount of from 0.2 to 1.0 percent by weight of said active solution.

8. The method of claim 1 wherein said alkyl aryl oxypoly(ethoxy)ethanol is in a concentration of from 0.0007 to 0.05 mol percent of said active solution.

9. The method of claim 1 wherein said alkyl aryl oxypoly(ethoxy)ethanol has said $R_3$ selected from the group consisting of octyl and nonyl, and $n$ is at least 2 and no greater than 7.

10. The method of claim 9 wherein said alkyl aryl oxypoly(ethoxy)ethanol is iso-nonyl phenyl oxypenta(ethoxy)ethanol.

11. The method of claim 10 wherein said iso-nonyl phenyl oxypenta(ethoxy)ethanol is in a concentration of from 0.02 to 1.5 percent by weight of said active solution.

12. The method of claim 11 wherein said iso-nonyl phenyl oxypenta(ethoxy)ethanol is present in a concentration of from 0.1 to 1.0 percent by weight of said active solution.

13. The method of claim 1 wherein said M dialkyl sulfosuccinate is in a concentration of from 0.0008 to 0.04 mol percent of said active solution.

14. The method of claim 13 wherein said M dialkyl sulfosuccinate is in a concentration of from 0.0008 to 0.008 mol percent of said active solution.

15. The method of claim 1 wherein said M dialkyl sulfosuccinate is sodium dialkyl sulfosuccinate wherein said dialkyl groups contain from 6 to 10 carbon atoms each, inclusive.

16. The method of claim 15 wherein said sodium dialkyl sulfosuccinate is sodium di(2-ethylhexyl) sulfosuccinate.

17. The method of claim 16 wherein said sodium di(2-ethylhexyl) sulfosuccinate is in a concentration of from 0.02 to 1.0 percent by weight of said active solution.

18. The method of claim 17 wherein said sodium di(2-ethylhexyl) sulfosuccinate is in a concentration of from 0.02 to 0.2 percent by weight of said active solution.

19. The method of claim 1 wherein said M dialkyl sulfosuccinate is a substituted ammonium dialkyl sulfosuccinate wherein said substituted ammonium cation is selected from the class consisting of ethylammonium, n-propylammonium, iso-propylammonium, n-butylammonium, iso-butylammonium, sec-butylammonium, and tert-butylammonium, and said dialkyl groups contains 6 to 10 carbon atoms each, inclusive.

20. A method of recovering oil from an oil-containing subterranean formation having completed therein an injection means comprising at least one injection well and a production means comprising at least one production well, comprising the steps of:

(a) injecting through said injection means a slug of from 0.01 to 10 percent pore volume of water;

(b) injecting through said injection means a slug of from 0.01 to 1 percent pore volume of an aqueous solution containing from 0.1 to 1.7 percent by weight of a chelating agent selected from the class consisting of tetrasodium ethylenediaminetetraacetic acid and sodium hexametaphosphate;

(c) injecting through said injection means a slug of from 1 to 10 percent pore volume of an active solution comprising water having incorporated therein from 0.13 to 2.5 percent by weight of sodium chloride, from 0.1 to 1 percent by weight of iso-nonyl phenyl oxypenta(ethoxy)ethanol, and from 0.02 to 0.5 percent by weight of sodium di(2-ethylhexyl) sulfosuccinate;

(d) injecting through said injection means water to drive said active solution toward said production means; and (e) producing oil from said formation through said production means.

21. In a method of recovering oil from a subterranean formation, the improvement comprising the steps of:

(a) injecting into said formation a slug of from 0.01 to 10 percent of the pore volume of said formation of a hydrocarbon solution comprising hydrocarbon solvent containing an alkyl aryl oxypoly(ethoxy)ethanol having the following structural formula:

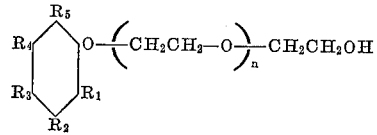

where $R_1$, $R_2$, $R_3$, $R_4$, and $R_5$ are selected from the group consisting of hydrogen and an alkyl group, at least one of $R_1$, $R_2$, $R_3$, $R_4$, and $R_5$ is an alkyl group containing at least 8 carbon atoms, and the total number of carbon atoms in the R groups taken together does not exceed 19, and $n$ is at least 2 and no greater than 6 when said total number of carbon atoms in said R groups is 8 and is one greater for each additional carbon atom above 8 in said total number of carbon atoms in said R groups; and (b) injecting into said formation an active solution comprising water containing an additive system in sufficient quantities to lower interfacial tension with said oil and said hydrocarbon solution, and to impart viscoelastic, shear hardening, and positive non-simple rheological propertiies, said additive system comprising:

(1) a strong electrolyte, (2) an alkyl aryl oxypoly(ethoxy)ethanol having the following structural formula:

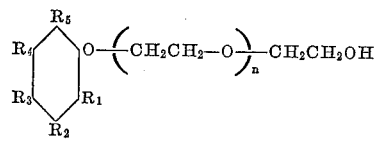

where $R_1$, $R_2$, $R_3$, $R_4$, and $R_5$ are selected from the group consisting of hydrogen and an alkyl group, at least one of $R_1$, $R_2$, $R_3$, $R_4$, and $R_5$ is an alkyl group containing at least 8 carbon atoms, and the total number of carbon atoms in the R groups taken together does not exceed 19, and $n$ is at least 2 and no greater than 6 when said total number of carbon atoms in said R groups is 8 and is one greater for each additional carbon atom above 8 in said total number of carbon atoms in said R groups, and
(3) an M dialkyl sulfosuccinate having the following structural formula:

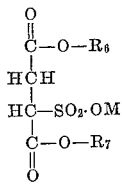

where M is a cation selected from the group consisting of lithium, potassium, sodium, ammonium, n-propylammonium, iso-propylammonium, toluidinium, methylammonium, ethylammonium, n-propylammonium, iso-propylammonium, n-butylammonium, iso-butylammonium, sec-butylammonium, and tert-butylammonium, $R_6$ is an alkyl group containing 5 to 16 carbon atoms, inclusive, and $R_7$ is an alkyl group containing 5 to 16 carbon atoms, inclusive.

22. The method of claim 21 wherein said slug of said hydrocarbon solvent contains said alkyl aryl oxypoly(ethoxy)ethanol in a concentration of from 0.009 to 0.7 mol percent of said hydrocarbon solution.

23. The method of claim 21 wherein said alkyl aryl oxypoly(ethoxy)ethanol employed in said hydrocarbon solution of Step (a) and employed in said active solution of Step (b) has said $R_3$ selected from the group consisting of octyl and nonyl, and $n$ is a number of at least 2 and no greater than 7.

24. The method of claim 23 wherein said alkyl aryl oxypoly(ethoxy)ethanol employed in said hydrocarbon solution and in said active solution is iso-nonyl phenyl oxypenta(ethoxy)ethanol.

25. The method of claim 24 wherein said iso-nonyl phenyl oxypenta(ethoxy)ethanol is in a concentration of from 0.02 to 1.5 percent by weight in said hydrocarbon solution and in said active solution.

26. The method of claim 25 wherein said iso-nonyl phenyl oxypenta(ethoxy)ethanol is present in a concentration of from 0.1 to 1.0 percent by weight in said hydrocarbon solution and in said active solution.

27. The method of claim 23 wherein said alkyl aryl oxypoly(ethoxy)ethanol employed in said hydrocarbon solution and in said active solution is iso-nonyl phenyl oxytri(ethoxy)ethanol.

References Cited
UNITED STATES PATENTS

| | | | |
|---|---|---|---|
| 2,792,894 | 5/1957 | Graham et al. | 166—9 X |
| 2,866,507 | 12/1958 | Bond et al. | 166—9 |
| 3,028,912 | 4/1962 | Berry et al. | 166—9 |
| 3,082,822 | 3/1963 | Holm et al. | 166—9 |
| 3,096,820 | 7/1963 | Bernard | 166—9 |
| 3,100,524 | 8/1963 | Beeson | 166—9 |
| 3,208,518 | 9/1965 | Patton | 166—9 |
| 3,302,712 | 2/1967 | Townsend et al. | 166—9 |

CHARLES E. O'CONNELL, *Primary Examiner.*
STEPHEN J. NOVOSAD, *Examiner.*

UNITED STATES PATENT OFFICE
CERTIFICATE OF CORRECTION

Patent No. 3,333,634  August 1, 1967

Harold L. Townsend et al.

It is hereby certified that error appears in the above numbered patent requiring correction and that the said Letters Patent should read as corrected below.

Column 1, line 15, for "pertoleum" read -- petroleum --; line 59, for "floding" read -- flooding --; column 2, line 6, for "devolping" read -- developing --; column 5, line 52, for "emperical" read -- empirical --; line 59, for "structure" read -- structural --; column 6, line 9, for "oxypoly(ethoxyethanol" read -- oxypoly(ethoxy)ethanol --; line 10, for "or" read -- of --; line 43, for "di-iso-hyptyl" read -- di-iso-heptyl --; line 44, strike out "sodium di-n-heptyl sulfosuccinate,"; line 62, for "di-n-actyl" read -- di-n-octyl --; line 65, for "sec-butlyammonium" read -- sec-butylammonium --; column 7, lines 12 to 21, for the lower left-hand portion of the formula reading C-O   read   C-OR same column 7, lines 12 to 21, for the lower right-hand portion of the formula reading C-   read   C-OR line 35, for "condiitons" read -- conditions --; column 10, line 32, for "port" read -- pore --; column 13, line 5, for "isobutylammonium" read -- iso-butylammonium --; line 72, for "contains" read -- contain --; column 14, line 54, for "propertiies" read -- properties --; column 15, line 15, beginning with "n-propylammonium," strike out all to and including "tert-butylammonium," in line 19, same column 15 and insert instead -- anilinium, o-toluidinium, p-toluidinium, m-toluidinium, methylammonium, ethylammonium, n-propylammonium, iso-propylammonium, n-butylammonium, iso-butylammonium, sec-butylammonium, and tert-butylammonium, --.

Signed and sealed this 25th day of June 1968.

(SEAL)
Attest:

EDWARD M. FLETCHER, JR.
Attesting Officer

EDWARD J. BRENNER
Commissioner of Patents